US012193979B1

(12) United States Patent
Goodman et al.

(10) Patent No.: US 12,193,979 B1
(45) Date of Patent: Jan. 14, 2025

(54) LIFT ASSIST CHAIR

(71) Applicants: Timothy Goodman, Reidsville, NC (US); Bradley Goodman, Reidsville, NC (US)

(72) Inventors: Timothy Goodman, Reidsville, NC (US); Bradley Goodman, Reidsville, NC (US)

(*) Notice: Subject to any disclaimer, the term of this patent is extended or adjusted under 35 U.S.C. 154(b) by 123 days.

(21) Appl. No.: 18/102,845

(22) Filed: Jan. 30, 2023

(51) Int. Cl.
*A61G 5/14* (2006.01)
*A47C 3/18* (2006.01)

(52) U.S. Cl.
CPC .................. *A61G 5/14* (2013.01); *A47C 3/18* (2013.01)

(58) Field of Classification Search
CPC ................ A61G 5/14; A47C 3/18; A47C 4/24
USPC .......................... 297/DIG. 10, 219.1, 219.12
See application file for complete search history.

(56) References Cited

U.S. PATENT DOCUMENTS 3,539,220 A * 11/1970 Henry ...................... A47C 3/22 297/DIG. 10
4,690,457 A 9/1987 Poncy
5,094,508 A * 3/1992 Bathrick .................. A61G 5/14 297/DIG. 10
5,931,532 A 8/1999 Kemmerer
6,553,585 B1 * 4/2003 Lundstrom .......... A61G 7/1007 4/667
7,540,565 B2 * 6/2009 Lipford .................... A61G 5/14 297/284.3
10,624,508 B2 * 4/2020 Duarte ................... A47K 13/28
10,758,439 B1 * 9/2020 Lake ........................ A47C 7/02

FOREIGN PATENT DOCUMENTS

CN 209005128 U * 6/2019
CN 212547427 U * 2/2021
CN 202664885 U * 1/2023
CN 117562745 B * 6/2024 ............... A61G 5/00

* cited by examiner

*Primary Examiner* — Milton Nelson, Jr.
(74) *Attorney, Agent, or Firm* — Sanchelima & Associates, P.A.; Jesus Sanchelima; Christian Sanchelima

(57) ABSTRACT

A chair with lifting mechanism including a linear actuator connected to an underneath side of the seat of a chair. A front edge of the seat is secured to the chair's frame by a pivot, whereas the rear edge of the seat is unattached, thereby permitting the seat to rotate about the pivot. The configuration of the actuator, this is extended or contracted, is dictated by control buttons located on the armrests of the chair that can be pressed by the user to assist him with standing. The actuator is powered by a power source that can be a cable cord for stationary use or a battery that allows the present invention to be relocated. The chair with lifting mechanism presents assistance for those who have mobility problems and struggle with standing from regular chairs. By including a seat that can be raised to a predetermined angle, the user can be lifted until he reaches a comfortable position to continue on his own.

6 Claims, 5 Drawing Sheets

LIFT ASSIST CHAIR

BACKGROUND OF THE INVENTION

1. Field of the Invention

The present invention relates to a chair and, more particularly, to a chair built with a lifting mechanism that assists a user with standing.

2. Description of the Related Art

Several designs for chairs with lifting mechanisms have been designed in the past. It is a widely known technology to include a mechanical element to lift the seat or base of a chair. None of them, however, include chair's seat that is hingedly attached at the front edge thereof, so when actuated the underneath portion of the seat would create an angle with respect to the front edge, thereby assisting the user to easily stand.

Applicant believes that a related reference corresponds to U.S. Pat. No. 4,690,457 issued for a chair with lift assistance mechanism. Applicant believes that another related reference corresponds to U.S. Pat. No. 5,931,532 issued for a lift recliner chair with safety system. None of these references, however, teach of a chair with a seat and backrest portion, wherein the seat portion is hinged and has an attached piston drive mechanism that is electrically powered. The electrically powered mechanism can be powered by a battery or a direct A.C. power source.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide assistance focused on senior adults that have lower body joint pain or arthritis.

It is another object of this invention to provide a chair that is operated by a linear actuator pushing the seat up to a 45 degree angle.

It is still another object of the present invention to provide a chair with a lifting mechanism that includes a supplemental power source so that the invention is not restricted by the power cord to be operated.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
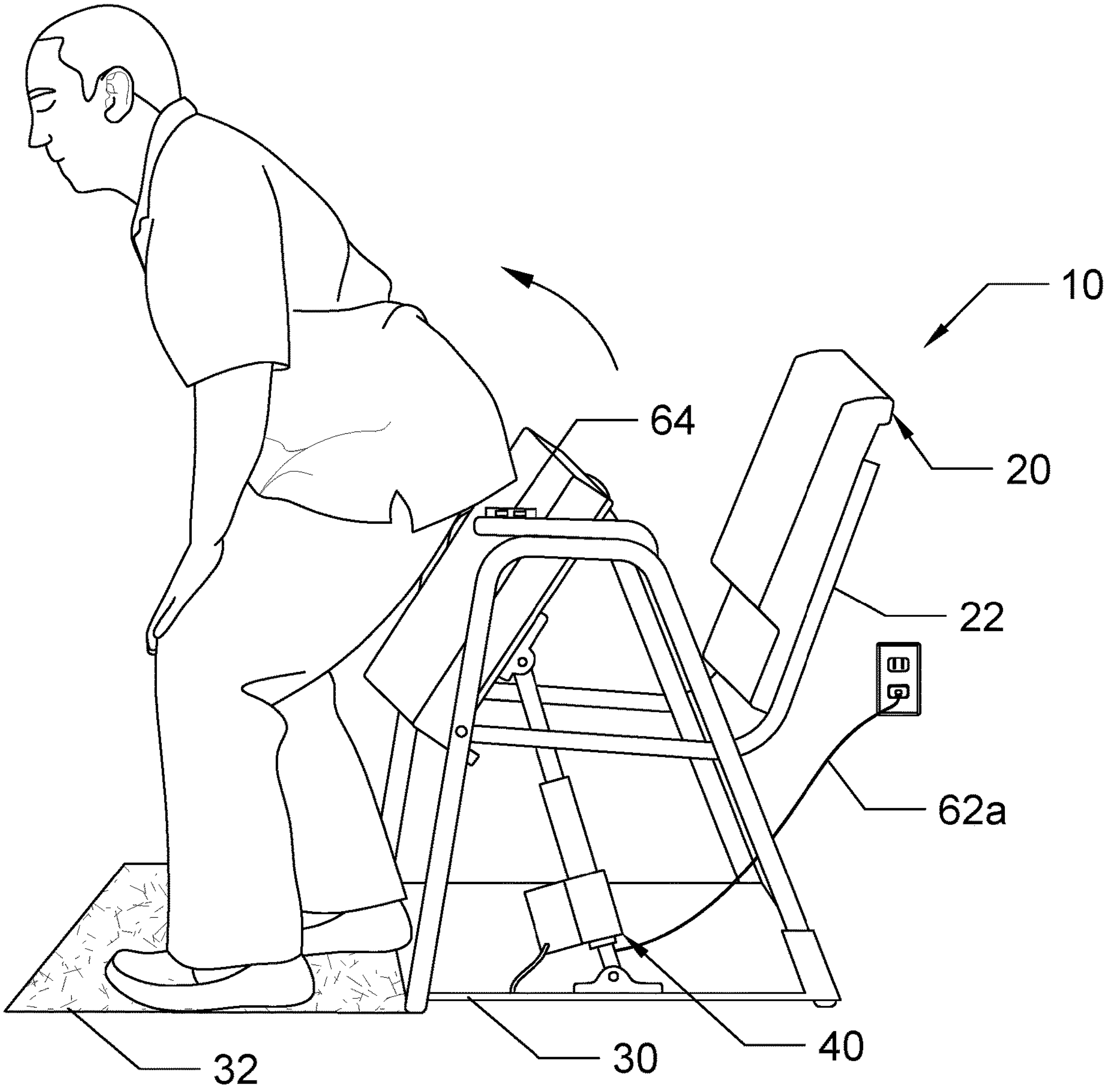
FIG. 1 represents an operational view of one embodiment of the present invention.

Referring now to the drawings, where the present invention is generally referred to with numeral 10, it can be observed that it basically includes a chair assembly 20, an actuation assembly 40, and an electrical assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
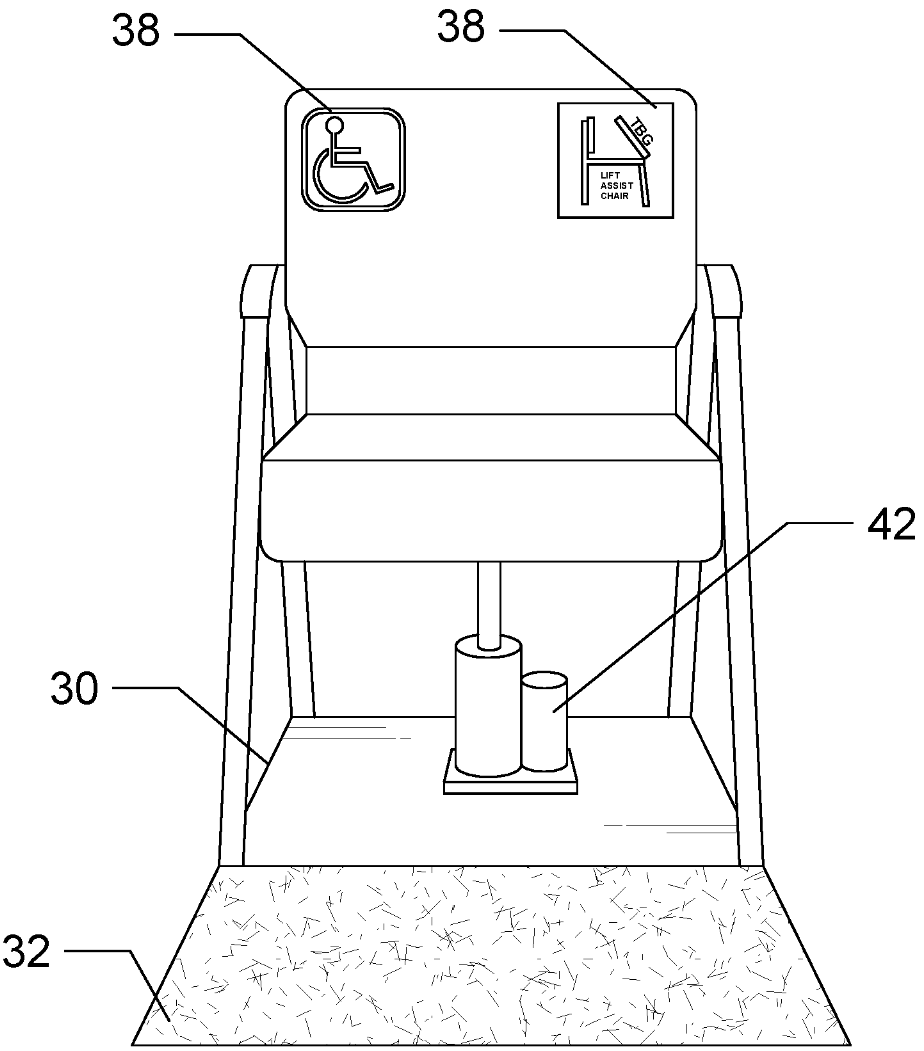
FIG. 4 shows a frontal view of another exemplary embodiment of the present invention.
Figure 5:
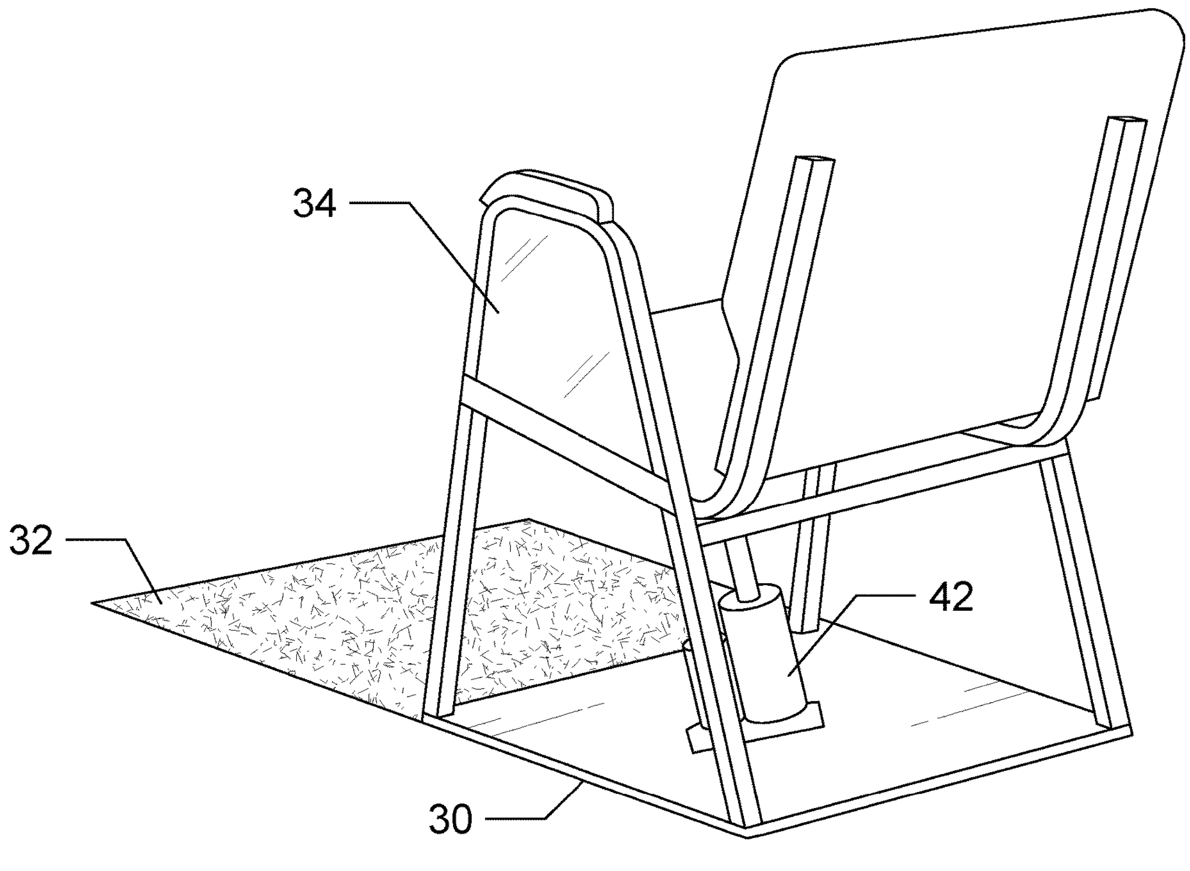
FIG. 5 illustrates a rear perspective view of the present invention.

In various exemplary embodiments, the chair assembly 20 may include a backrest 22, a seat 24, arm rests 26, and legs 28. The general structure of chairs is widely known in the art. Nonetheless, a brief description of its fundamental parts is herein included to further support the novelty aspects of the present invention. Said chair assembly 20 may include a frame to hold up the various components above mentioned. The frame may be made of a resistant, lightweight, durable, and/or sturdy material. In different exemplary embodiments, the frame may be made of materials such as polymers, natural or synthetic fibers, wood, metal alloys, steel, aluminum, and/or any other suitable material from the art. In one exemplary embodiment, the chair assembly 20 may include 4 legs disposed in a quadrangular/rectangular arrangement. In different embodiments, the chair may include more or less than four legs as long as they provide stability for a user to seat thereon. In the present exemplary embodiment, the legs 28 may have an elongated shape. The legs 28 may present different geometries, for instance, a cylindrical geometry may be suitable. A base 30 may be attached at a bottommost end of the legs as shown in exemplary FIGS. 1-3. Said base 30 may have a planar surface configured to receive elements from activation assembly 40 and the electrical assembly 60 thereon. The seat 24 may be located on a top distal end of the legs 28, wherein both the seat 24 and the base 30 are distal with respect to each other. The seat 24 may have any suitable shape and area to receive a user thereon. In suitable embodiment, the seat 24 may have circular shape, rectangular shape, quadrangular shape, or the like. In other exemplary embodiments the seat 24 may have an ergonomic shape. At a front edge, the seat 24 may be attached to the frame by means of a pivot 29. Said pivot 29 may work as an axis for the sear to rotate about, thereby defining a movable joint. The rear edge of the seat 24 may be free from attachments as depicted in FIGS. 1 and 3. In one embodiment, the pivot may be an elongated member (preferably having a cylindrical shape) that traverses said seat 24 from one lateral side to the opposite side, wherein both lateral sides are parallel to each other. In other suitable embodiments, the seat 24 may be secured to the frame by means of hinges which would also create a movable joint to allow a predetermined angle of rotation between the seat 24 and the frame. The armrests 26 may be located at lateral sides of the seat 24. The chair assembly 20 further includes a safety mat 32 attached to the base 30 as pictured in FIG. 1 and FIG. 5. The safety mat 32 is included to prevent the chair from sliding backwards when the user weight is applied to the front of the seat. The safety mat 32, in various embodiments, may be made of an anti-slip material. When in operation, as the seat raises, there is a risk of having the arm, hand, or even electronic devices pressend by the seat against the arm rests 26; in order to hinder such a risk, the present invention 10 includes safety panels 34 that would prevent any limb or device from traversing the arm rest space, keeping them from being pressed. The safety panels 34 may be made of a rigid and sturdy material. In a suitable embodiment, the safety panels 34 may be made of polymers, fibers, natural and/or synthetic materials, metals, or any other suitable material from the art. Furthermore, the safety panels 34 may have any suitable geometry that would completely cover the space formed below the arm rests 26. For explanatory purposes, and as can be appreciated throughout the figures, the space formed by the arm rests 26 may be substantially trapezoidal, thus the safety panels 34 are presented having such a shape. Nonetheless, in other suitable embodiments, the safety panels 34 may have any other suitable shape that conforms with the space formed by the arm rests 26. As can be seen in FIG. 4, the present invention may include signages 38 to convey how the system operates and that it can be used by disabled users.

Figure 2:
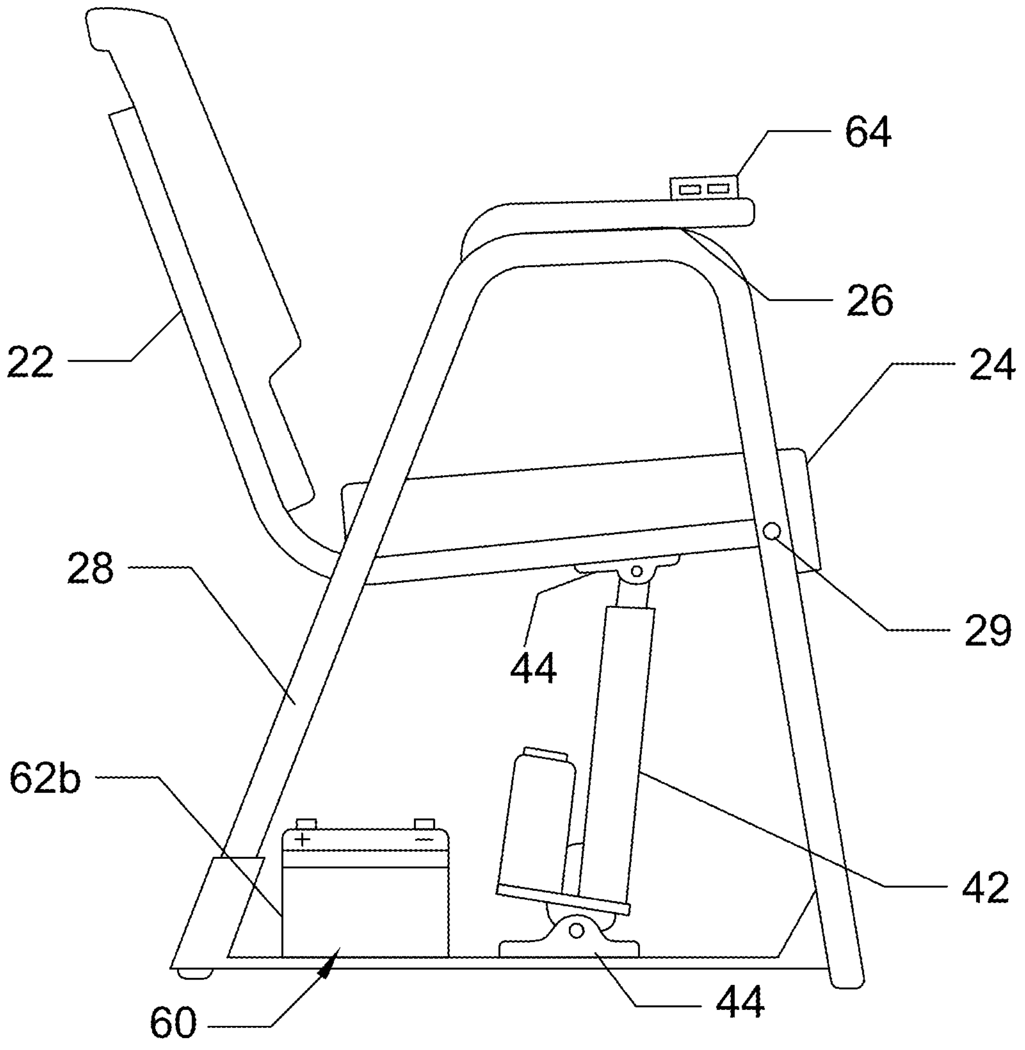
FIG. 2 shows a lateral view of one exemplary embodiment of the present invention in initial conditions
Figure 3:
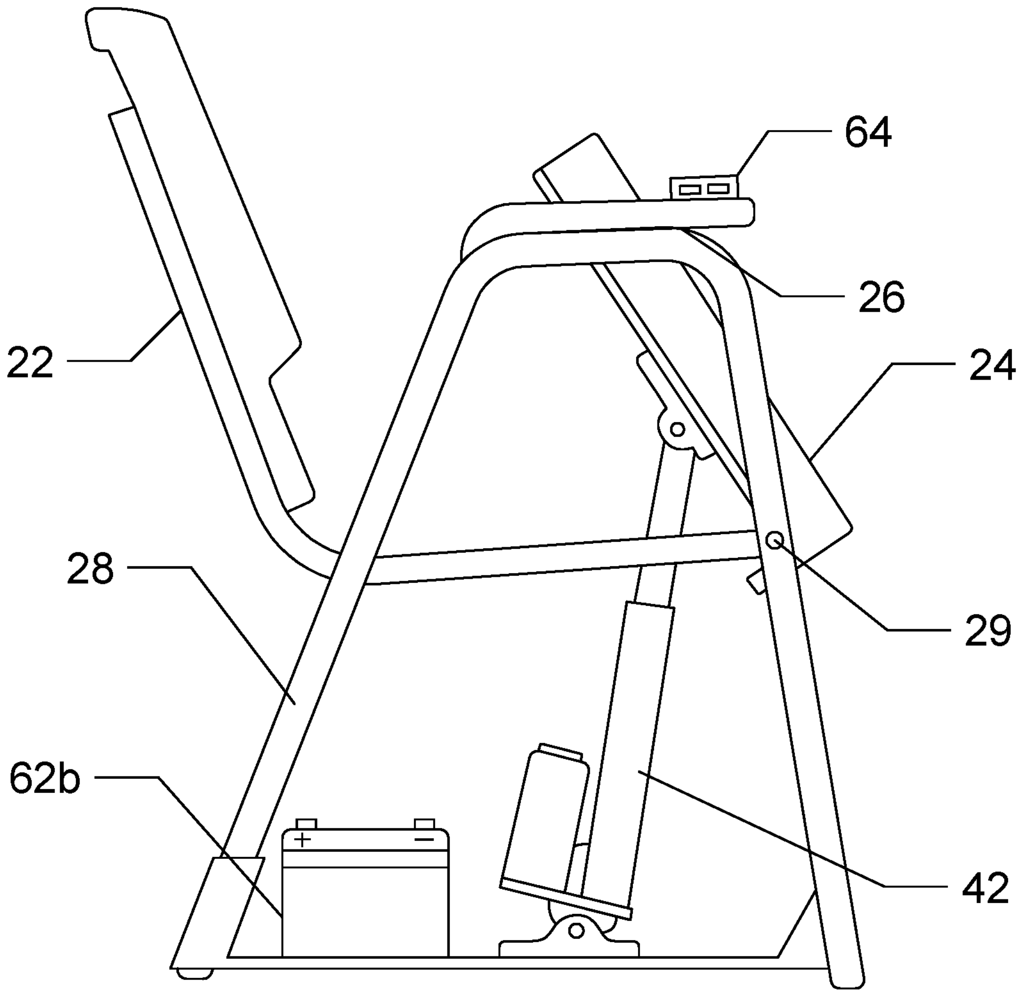
FIG. 3 illustrates a lateral view of another exemplary embodiment of the present invention in operation.

Exemplary embodiments of FIGS. 1-3 show the actuation assembly 40 which includes an actuator 42. Said actuator 42 is located therebetween said base 30 and said seat 24. The actuator 42 is attached to said base 30 and to an underneath surface of the seat 24 by means of revolute joints 44. The actuator is affixed by said revolute joints 44 but, at the same time, they allow motion around their respective rotation axis. This is useful because, although restricted, the actuator 42 has room for displacement in order to achieve its main purpose. In one preferred embodiment, the actuator may be an electric linear actuator that uses control signals to extend and retract its rod. In other embodiments, the actuator may be a pneumatic or hydraulic actuator having control units accordingly. In one embodiment, the actuator 42 being an eclectic linear actuator may be formed by an electric motor that drives motion to an internal spindle by means of gears and various transmission elements from the art to retract or extend the rod. The foregoing is a general explanation of the main components that may compose an electric linear actuator, which should not be considered in a limiting sense but for explanatory purposes. Linear actuators that may use different technologies to achieve its main purpose, this is creating motion in a straight line, can also be used. The rod of the actuator 42 may have a suitable length to raise the rear edge of the seat and create a predetermined angle, for instance 45° that may be the best position for the seat to assist standing of the user without compromising user safety.

The electric assembly 60 may include a power source and control buttons 64. In one exemplary embodiment such as the one presented in FIG. 1, the actuator 42 is powered from a conventional A.C. supply source by connecting the power source in the form of an electric cord 62*a* to an electrical outlet. In another complementary embodiment, the present invention 10 may include a power source in the form of a battery 62*b* that in one embodiment may be a rechargeable battery or a single-use battery. The battery may provide sufficient power to operate said actuator 42. Depending on the type of current needed to operate the actuator 42 and the used power source, a DC to AC transformer (or vice versa—an AC to DC transformer) may be electrically connected between the power supply (62*a*, 62*b*) and the actuator 42. The actuator 42 may be in electrical communication with the power source (62*a*, 62*b*). The control buttons 64 may be in electrical communication with the actuator 42. In a suitable embodiment, the control buttons 64 may be located on one or both armrests 26. A user may govern the up and down behavior of the actuator 42 by means of said buttons. In various embodiments, the control buttons 64 may be a toggle switch, push buttons, selector switch, and/or any suitable variation thereof.

One of the main benefits of the present invention is that it does not require extra space to recline the seat as reclinable seats do. This way, the present invention 10 can be implemented in environments, such as hospital waiting rooms, that are normally populated with people having various mobility problems. The present invention can also be introduced in existing chairs by just performing a small change in the way the seat is attached to the frame, this is freeing its rear edge and including a movable joint for the seat to rotate about it, and including the base having the actuation assembly.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A lift assist chair, comprising:

a chair assembly including a seat secured to a frame by means of a pivot, a backrest, legs and a base, wherein said base is located at a bottommost end of said legs, said seat rotates about said pivot, said chair assembly further includes armrests, said armrests forming lateral spaces that are covered by safety panels, attached to a front portion of the base there is a safety mat configured to prevent said lift assist chair from sliding backwards when weight is applied to a front of the seat;

an actuation assembly including an actuator, a base of said actuator is secured to said base, a rod of said actuator is secured to an underneath surface of said seat, thereby, the angle of the seat is subject to configuration of the actuator, this is extended or retracted, said actuator is electrically powered by a power source, said actuator is a linear actuator;

an electrical assembly including control buttons, said control buttons are in electrical communication with said actuator, the control buttons are configured to extend and retract said rod when pressed, said control buttons are located on said armrests;

when extended, said actuator raises a back end of said seat causing it to slant 45° with respect to the horizontal; and when contracted, said seat rests in horizontal configuration relative to the frame.

2. The lift assist chair of claim 1, wherein said actuator is powered from an A.C. supply source by connecting the power source in the form of an electric cord to an electrical outlet.

3. The lift assist chair of claim 1, wherein said power source is provided in the form of a battery mounted onto said base.

4. The lift assist chair of claim 1, wherein said actuator is affixed therebetween said base and said underneath surface of said seat by means of revolute joints.

5. The lift assist chair of claim 4, wherein said actuator is powered from an A.C. supply source by connecting the power source in the form of an electric cord to an electrical outlet.

6. A lift assist chair, consisting of:

a chair assembly including a seat secured to a frame by means of a pivot, a backrest, legs and a base, wherein said base is located at a bottommost end of said legs, said seat rotates about said pivot, said chair assembly further includes armrests, said armrests forming lateral spaces that are covered by safety panels, attached to a front portion of the base there is a safety mat configured to prevent said lift assist chair from sliding backwards when weight is applied to a front of the seat;

an actuation assembly including an actuator, a base of said actuator is secured to said base by means of revolute joints, a rod of said actuator is secured to an underneath surface of said seat by means of revolute joints, thereby, the angle of the seat is subject to the configuration of the actuator, this is if the rod is extended or retracted, said actuator is electrically powered by a power source, said actuator is a linear actuator;

an electrical assembly including control buttons and said power source, said control buttons are in electrical communication with said actuator, the control buttons are configured to extend and retract said rod when pressed, said control buttons are located on said armrests;

when extended, said actuator raises a back end of said seat causing it to have a slope of 45° with respect to the horizontal; and when said rod is contracted, said seat rests in horizontal configuration relative to the frame.

* * * * *